(12) United States Patent
Watanabe

(10) Patent No.: US 8,955,882 B2
(45) Date of Patent: Feb. 17, 2015

(54) STEERING APPARATUS

(75) Inventor: Masajirou Watanabe, Gunma-ken (JP)

(73) Assignee: NSK Ltd., Tokyo (JP)

(*) Notice: Subject to any disclaimer, the term of this patent is extended or adjusted under 35 U.S.C. 154(b) by 108 days.

(21) Appl. No.: 13/810,097

(22) PCT Filed: Jul. 19, 2012

(86) PCT No.: PCT/JP2012/068333
§ 371 (c)(1),
(2), (4) Date: Jan. 14, 2013

(87) PCT Pub. No.: WO2013/018554
PCT Pub. Date: Jul. 2, 2013

(65) Prior Publication Data
US 2013/0228033 A1    Sep. 5, 2013

(30) Foreign Application Priority Data

Aug. 1, 2011   (JP) ................................ 2011-168431

(51) Int. Cl.
*B62D 1/18*      (2006.01)
*B62D 1/184*     (2006.01)
*G05D 15/00*     (2006.01)

(52) U.S. Cl.
CPC ............... *B62D 1/184* (2013.01); *G05D 15/00* (2013.01)
USPC ............. 280/775; 280/771; 280/777; 74/493; 74/529

(58) Field of Classification Search
CPC ........ B62D 1/184; B62D 1/185; B62D 1/187; B62D 1/189; B62D 1/195
USPC ............ 74/493, 529, 531; 280/771, 775, 776, 280/777
See application file for complete search history.

(56) References Cited

U.S. PATENT DOCUMENTS

| 2002/0089161 | A1 | 7/2002 | Yamamura et al. | |
| 2003/0000330 | A1* | 1/2003 | Murakami et al. | 74/492 |
| 2007/0295143 | A1* | 12/2007 | Oh | 74/493 |

(Continued)

FOREIGN PATENT DOCUMENTS

| JP | 5-262238 A | 10/1993 |
| JP | 2002-166835 A | 6/2002 |

(Continued)

OTHER PUBLICATIONS

English translation of International Preliminary Report on Patentability from International Patent Application No. PCT/JP2012/068333, mailed Feb. 13, 2014.

*Primary Examiner* — Ruth Ilan
*Assistant Examiner* — Darlene P Condra
(74) *Attorney, Agent, or Firm* — Miles & Stockbridge P.C.

(57) ABSTRACT

An inner column 2 is fitted in an outer column 1 in such a way as to be able to slide in the axial direction. The outer column 1 is mounted on a vehicle body 5 by a vehicle mount bracket 3. Fastening portions 65B, 65B of a right distance bracket 6B pass through through-holes 13, 14 respectively to be able to be in contact with the outer circumference 21 of the inner column and directly fasten the outer circumference of the inner column. Thus, there is provided a steering apparatus that is simple in structure without need to provide an additional mechanism for preventing rotation of an inner column and in which the magnitude of fastening force exerted on the inner column does not vary depending on the telescopic position of the steering wheel.

8 Claims, 16 Drawing Sheets

(56) References Cited

U.S. PATENT DOCUMENTS

| | | |
|---|---|---|
| 2009/0120230 A1* | 5/2009 | Park .............................. 74/493 |
| 2010/0139439 A1* | 6/2010 | Uesaka .......................... 74/493 |
| 2010/0242664 A1 | 9/2010 | Thompson et al. |
| 2012/0198956 A1* | 8/2012 | Takezawa et al. ............. 74/493 |

FOREIGN PATENT DOCUMENTS

| | | |
|---|---|---|
| JP | 2002-274393 A | 9/2002 |
| JP | 2010-132179 A | 6/2010 |
| JP | 2010-280241 A | 12/2010 |
| WO | WO 2009/013457 A1 | 1/2009 |

* cited by examiner

STEERING APPARATUS

TECHNICAL FIELD

The present invention relates to a steering apparatus, in particular to a steering apparatus in which an outer column and an inner column are fitted in such a way as to allow their relative sliding movement along the axial direction, so that the telescopic position of the steering wheel can be adjusted and that the steering wheel moves upon secondary collision to absorb impact load.

BACKGROUND ART

There are steering apparatuses in which an outer column and an inner column are fitted in such a way as to allow their relative sliding movement along the axial direction, so that the telescopic position of the steering wheel can be adjusted or that impact load upon secondary collision is absorbed.

In a steering apparatus disclosed in PCT Publication WO2009/013457, the diameter of an outer column having a slit is reduced to tightly secure the outer circumference of an inner column by the inner circumference of the outer column, thereby clamping the inner column in such a way as not to allow its axial movement relative to the outer column.

In the steering apparatus disclosed in PCT Publication WO2009/013457, the slit extends in to axial direction with its one end opening on the end face of the outer column. In consequence, when fastening the outer column to reduce the diameter, the amount of reduction in the diameter varies among fastening positions, and the magnitude of the fastening force exerted on the inner column by the outer column also varies accordingly. Therefore, there is a problem that a variation in the fastening position of the outer column with the telescopic position of the steering wheel leads to a variation in the fastening force exerted on the inner column by the outer column.

In a steering apparatus disclosed in Japanese Patent Application Laid-Open No. 2002-274393, an inner column is clamped directly by a distance bracket so that the magnitude of the fastening force exerted on the inner column by an outer column does not vary depending on the telescopic position of the steering wheel.

In a steering apparatus disclosed in Japanese Patent Application Laid-Open No. 5-262238, an inner column is clamped directly by a pressing piece slidably supported on a distance bracket so that the magnitude of the fastening force exerted on the inner column by an outer column does not vary depending on the telescopic position of the steering wheel.

PRIOR ART DOCUMENT

Patent Document

Patent Document 1: PCT Publication WO2009/013457
Patent Document 2: Japanese Patent Application Laid-Open No. 2002-274393
Patent Document 3: Japanese Patent Application Laid-Open No. 5-262238

SUMMARY OF THE INVENTION

Problem to be Solved by the Invention

The steering apparatuses disclosed in Japanese Patent Application Laid-Open No. 2002-274393 and Japanese Patent Application Laid-Open No. 5-262238, the outer column is disposed on the front side with respect to the vehicle body, and the inner column is disposed rear side of the outer column with respect to the vehicle body. Therefore, it is necessary to additionally provide a mechanism for preventing rotation of the inner column, leading to problems such as complexity in the structure and increase in the manufacturing cost.

Means for Solving the Problem

An object of the present invention is to provide a steering apparatus that is simple in structure without need to provide an additional mechanism for preventing rotation of an inner column and in which the magnitude of fastening force exerted on the inner column does not vary depending on the telescopic position of the steering wheel.

The above object is achieved by the following means. Specifically, according to the present invention, there is provided a steering apparatus comprising:

an inner column;

a hollow outer column externally fitted on said inner column in such a way as to be able to slide relative to said inner column in an axial direction;

a vehicle mount bracket that can be attached to a vehicle body;

a pair of distance brackets including a left distance bracket and a right distance bracket each having one end fixed to outer circumference of said outer column, the pair of distance brackets being slidably held between left and right side plates provided in said vehicle mount bracket;

a fastening portion that is provided on the other end of one distance bracket among said pair of distance brackets and can be in contact with the outer circumference of said inner column to fasten the outer circumference of said inner column:

a fastening portion that is provided on the other end of the other distance bracket among said pair of distance brackets and can be in contact with the outer circumference of said outer column to fasten the outer circumference of said outer column;

a through hole provided in the outer column, through which the fastening portion of said one distance bracket passes;

a clamp apparatus that fastens said left and right side plates of said vehicle mount bracket toward said pair of distance brackets, wherein said inner column is clamped in such a way that it cannot move in the axial direction relative to said outer column by tightening said left and right side plates of said vehicle mount bracket, directly fastening the outer circumference of said inner column with the fastening portion of said one distance bracket, and fastening the outer circumference of said outer column with the fastening portion of said other distance bracket.

According to a preferred mode of the present invention, there is provided a steering apparatus in which when said left and right side plates of said vehicle mount bracket are fastened toward said pair of distance brackets by said clamp apparatus, said one distance bracket is in sliding contact with one side plate among said left and right side plates that elastically deforms to a larger extent than the other.

According to a preferred mode of the present invention, there is provided a steering apparatus in which said pair of distance brackets are separate parts.

According to a preferred mode of the present invention, there is provided a steering apparatus in which the fastening portion of said one distance bracket is provided at both ends of said one distance bracket with respect to the front-rear direction of the vehicle and on an inner face, with respect to the vehicle width direction, of a bent portion that is bent inward with respect to the vehicle width direction.

According to a preferred mode of the present invention, there is provided a steering apparatus in which when said left and right side plates of said vehicle mount bracket are fastened toward said pair of distance brackets by said clamp apparatus, said one distance bracket is in sliding contact with one side plate among said left and right side plates that elastically deforms to a smaller extent than the other.

According to a preferred mode of the present invention, there is provided a steering apparatus in which said pair of distance brackets are respectively provided with long grooves extending along the axial direction of said inner column, through which a rod that is prevented from moving in the axial direction of said inner column by said left and right side plates of said vehicle mount bracket passes, and when said pair of distance brackets and said outer column are moved in the axial direction relative to said vehicle mount bracket, abutment of the front or rear end, with respect to the vehicle body, of said long grooves to said rod prevents further movement of said pair of distance brackets and said outer column in the axial direction.

As described above, the steering apparatus according to the present invention has the hollow outer column externally fitted on the inner column in such a way as to be able to slide relative to the inner column in the axial direction, the pair of distance brackets including the left and right distance brackets each having one end fixed to the outer circumference of the outer column, which are slidably held between the left and right side plates of the vehicle mount bracket, the fastening portion that is provided on the other end of one distance bracket among the pair of distance brackets and can be in contact with the outer circumference of the inner column to fasten the outer circumference of the inner column, the fastening portion that is provided on the other end of the other distance bracket among the pair of distance brackets and can be in contact with the outer circumference of the outer column to fasten the outer circumference of the outer column, the through hole provided in the outer column, through which the fastening portion of said one distance bracket passes, and the clamp apparatus that fastens the left and right side plates of the vehicle mount bracket toward the pair of distance brackets.

With the above-described construction, the inner column is clamped in such a way that it cannot move in the axial direction relative to the outer column by tightening the left and right side plates of the vehicle mount bracket, directly fastening the outer circumference of the inner column with the fastening portion of said one distance bracket, and fastening the outer circumference of the outer column with the fastening portion of said other distance bracket.

Thus, the outer circumference of the inner column is directly fastened by the fastening portion of said one distance bracket. In consequence, the magnitude of the fastening force exerted on the inner column by the pair of distance brackets does not change depending on the telescopic position of the steering wheel. Furthermore, since the pair of distance brackets are always held between the left and right side plates of the vehicle mount bracket, it is not necessary to provide an additional mechanism for preventing the rotation of the outer column and the inner column. Therefore, the structure is simple, and reduction in the manufacturing cost can be achieved.

MODE FOR CARRYING OUT THE INVENTION

Figure 1:
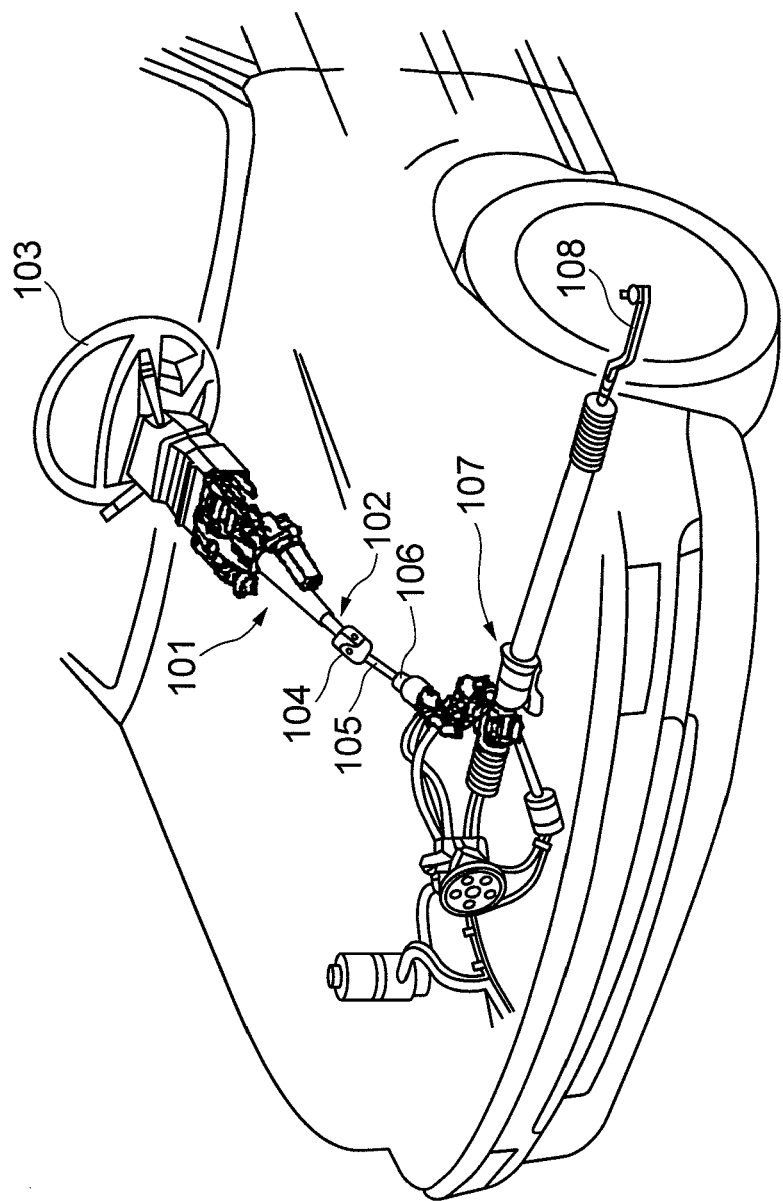
FIG. 1 is an overall perspective view of a steering apparatus according to an embodiment of the present invention mounted on a vehicle.

FIG. 1 is an overall perspective view of a steering apparatus according to an embodiment of the present invention mounted on a vehicle.

As shown in FIG. 1, the steering apparatus 101 rotatably supports a steering shaft 102. A steering wheel 103 is attached on the upper end or the rear end (with respect to the vehicle body) of the steering shaft 102, and an intermediate shaft 105 is coupled to the lower end or the front end (with respect to the vehicle body) of the steering shaft 102 via a universal joint 104.

The lower end of the intermediate shaft 105 is coupled to a universal joint 106, to which is coupled a steering gear assembly 107 composed of a rack-and-pinion mechanism or the like.

As a driver turns the steering wheel 103, the torque is transmitted to the steering gear assembly 107 via the steering shaft 102, the universal joint 104, the intermediate shaft 105, and the universal joint 106, whereby a tie rod 108 is shifted via the rack-and-pinion mechanism. Thus, the steering angle of the wheels can be changed.

Figure 2:
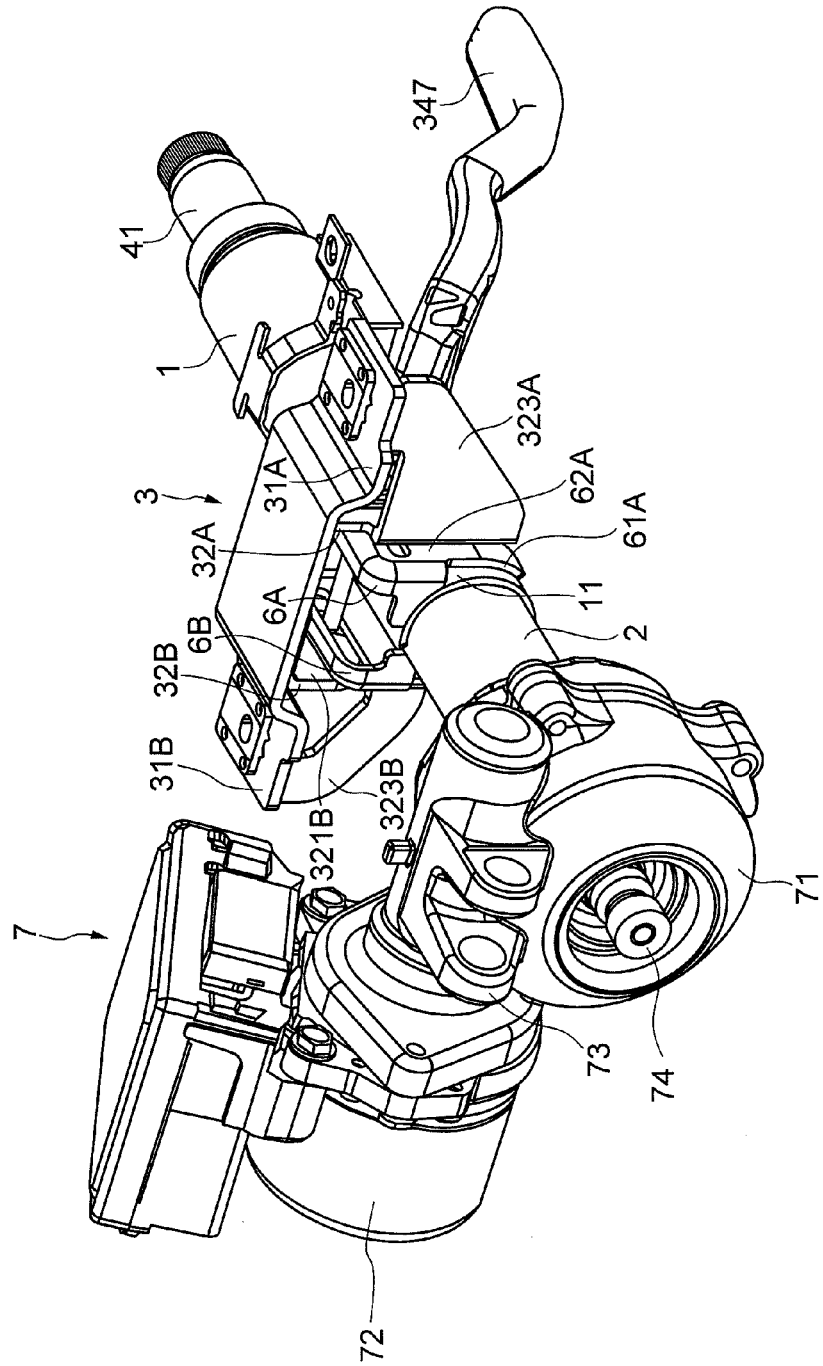
FIG. 2 is a front perspective view of the steering apparatus according to the embodiment of the present invention seen from above.
Figure 3:
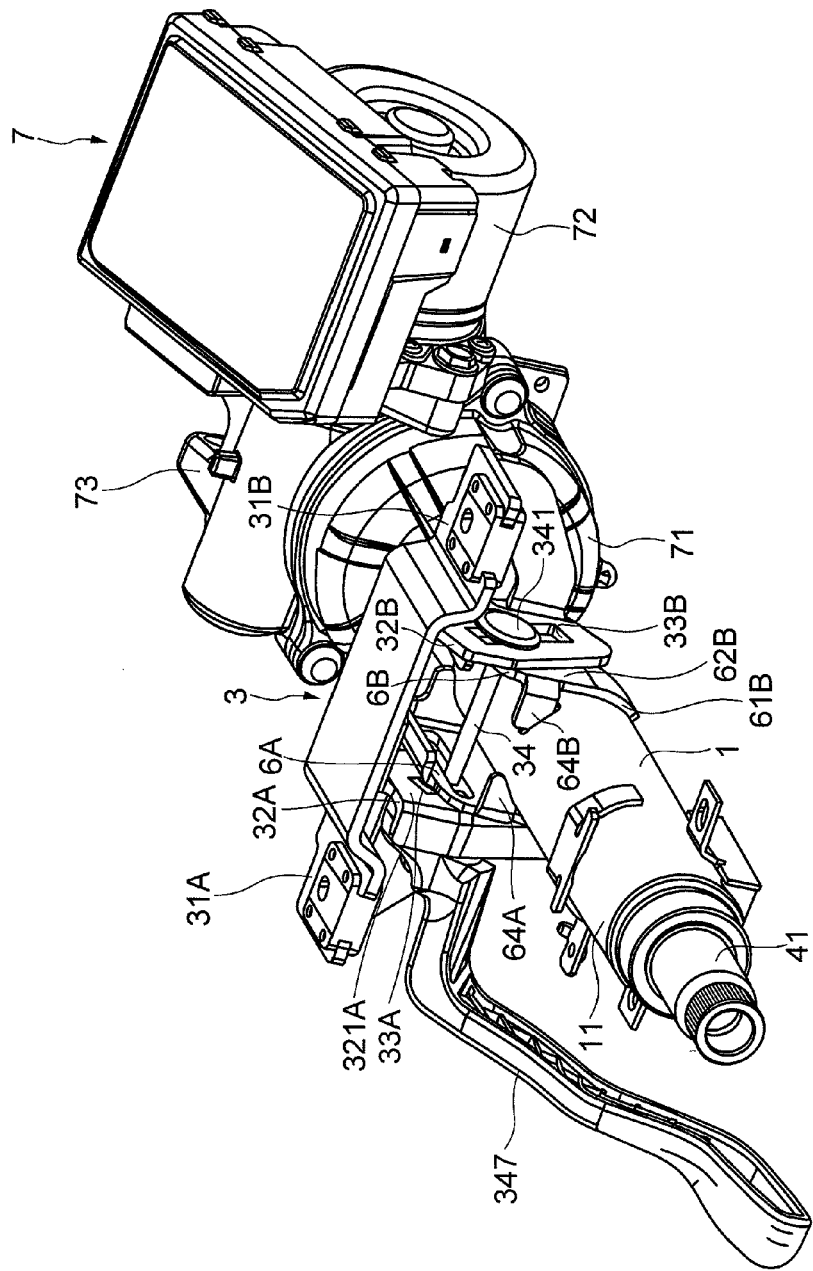
FIG. 3 is a rear perspective view of the steering apparatus according to the embodiment of the present invention seen from above.
Figure 4:
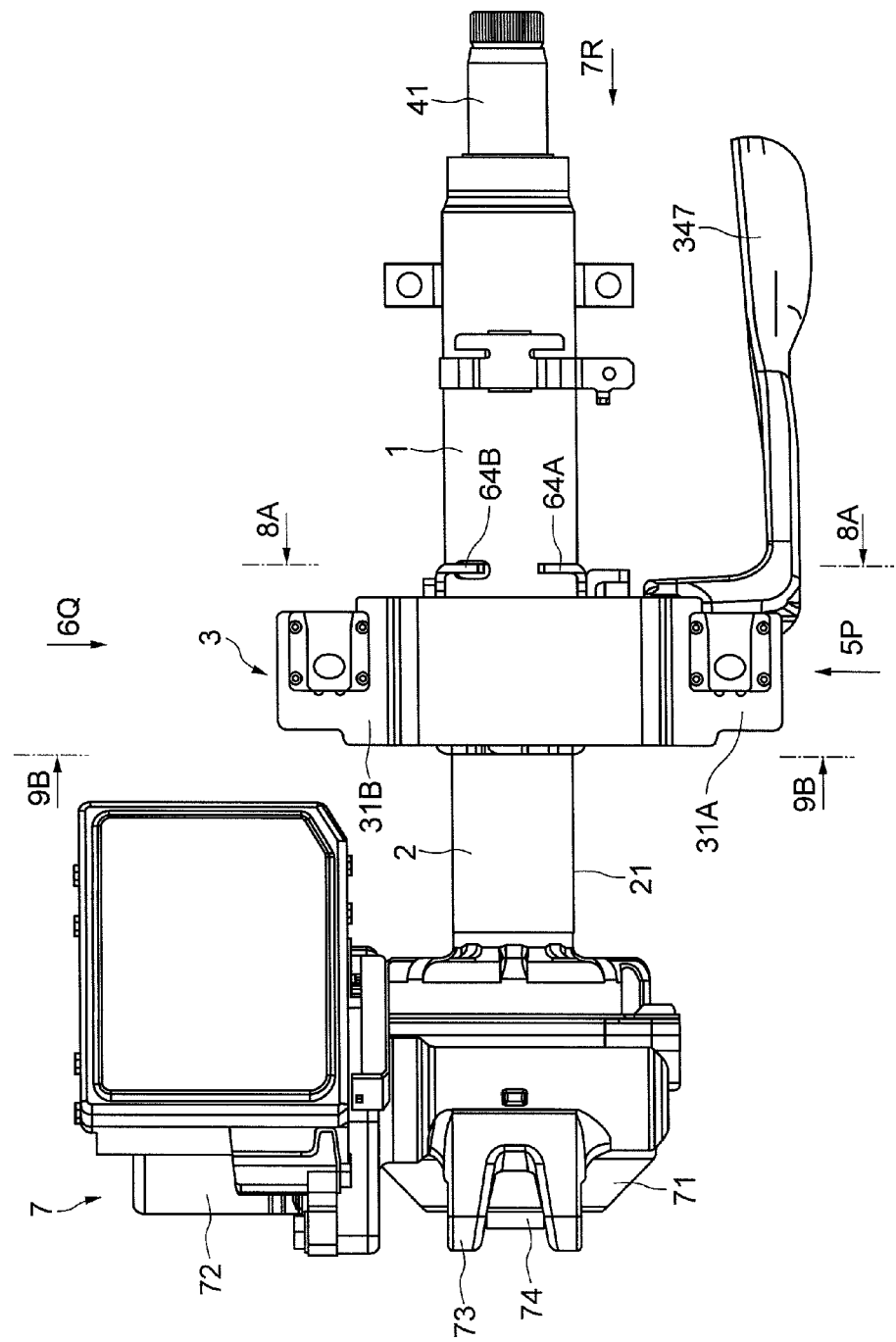
FIG. 4 is a top plan view of the steering apparatus in FIG. 2.
Figure 5:
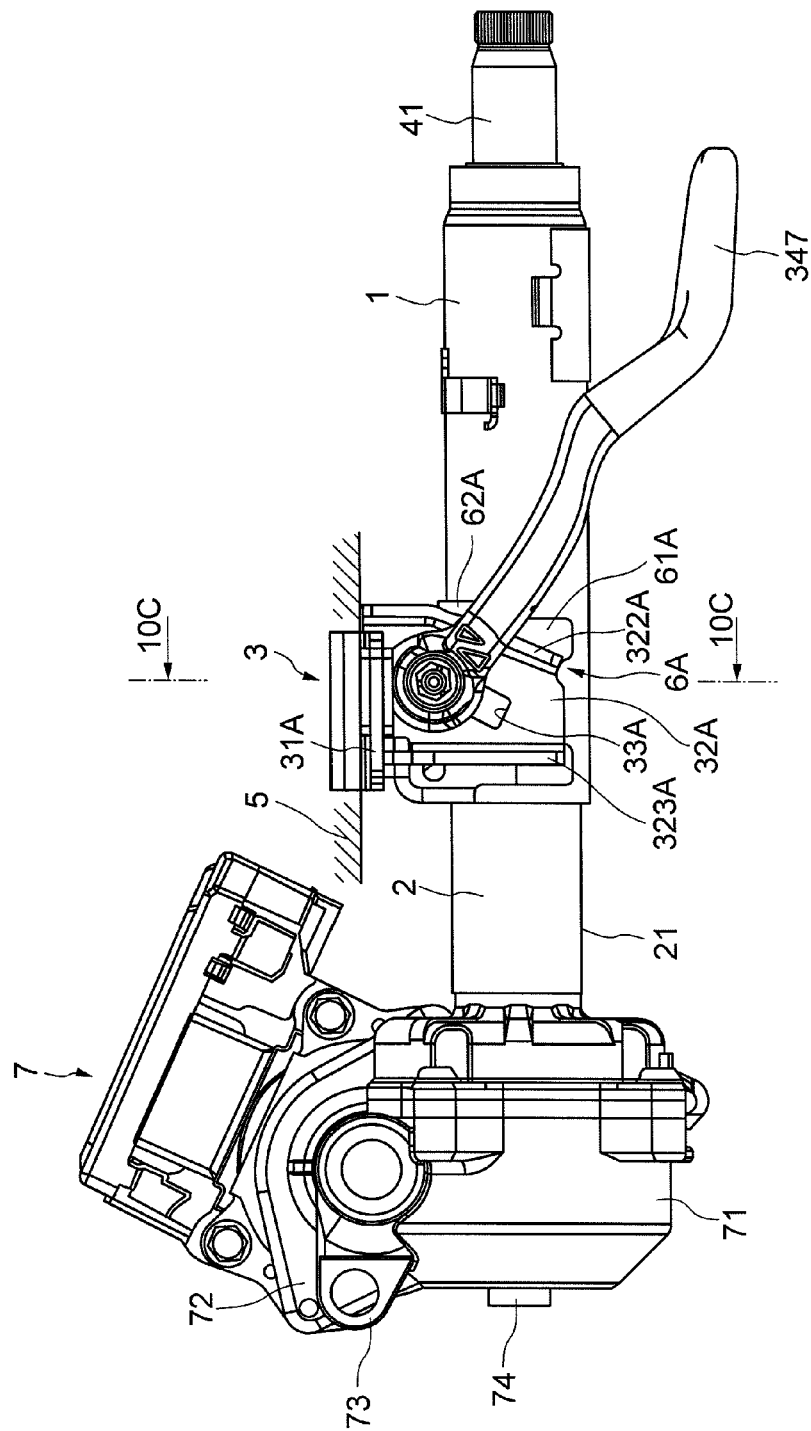
FIG. 5 is a view seen from the direction of arrow 5P in FIG. 4.
Figure 6:
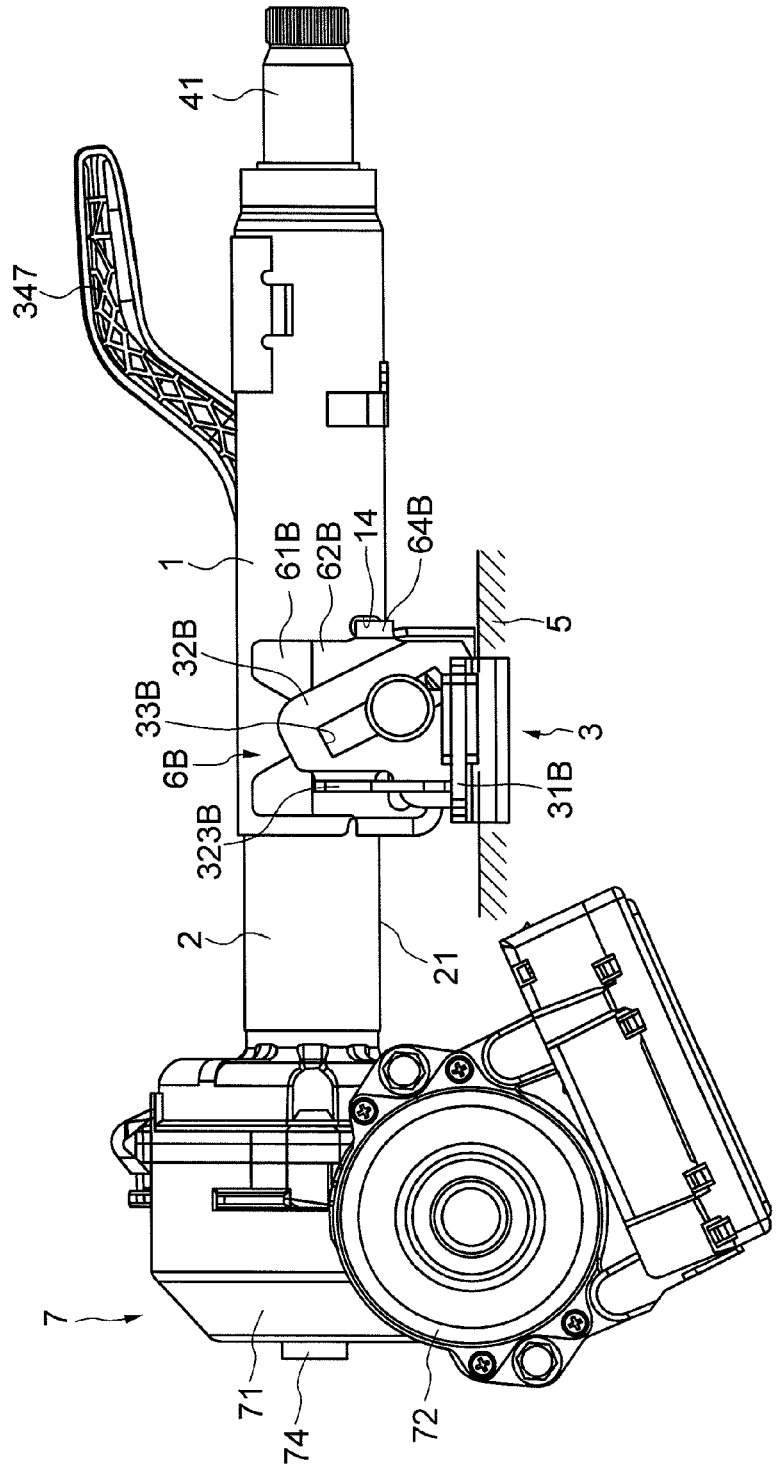
FIG. 6 is a view seen from the direction of arrow 6Q in FIG. 4.
Figure 7:
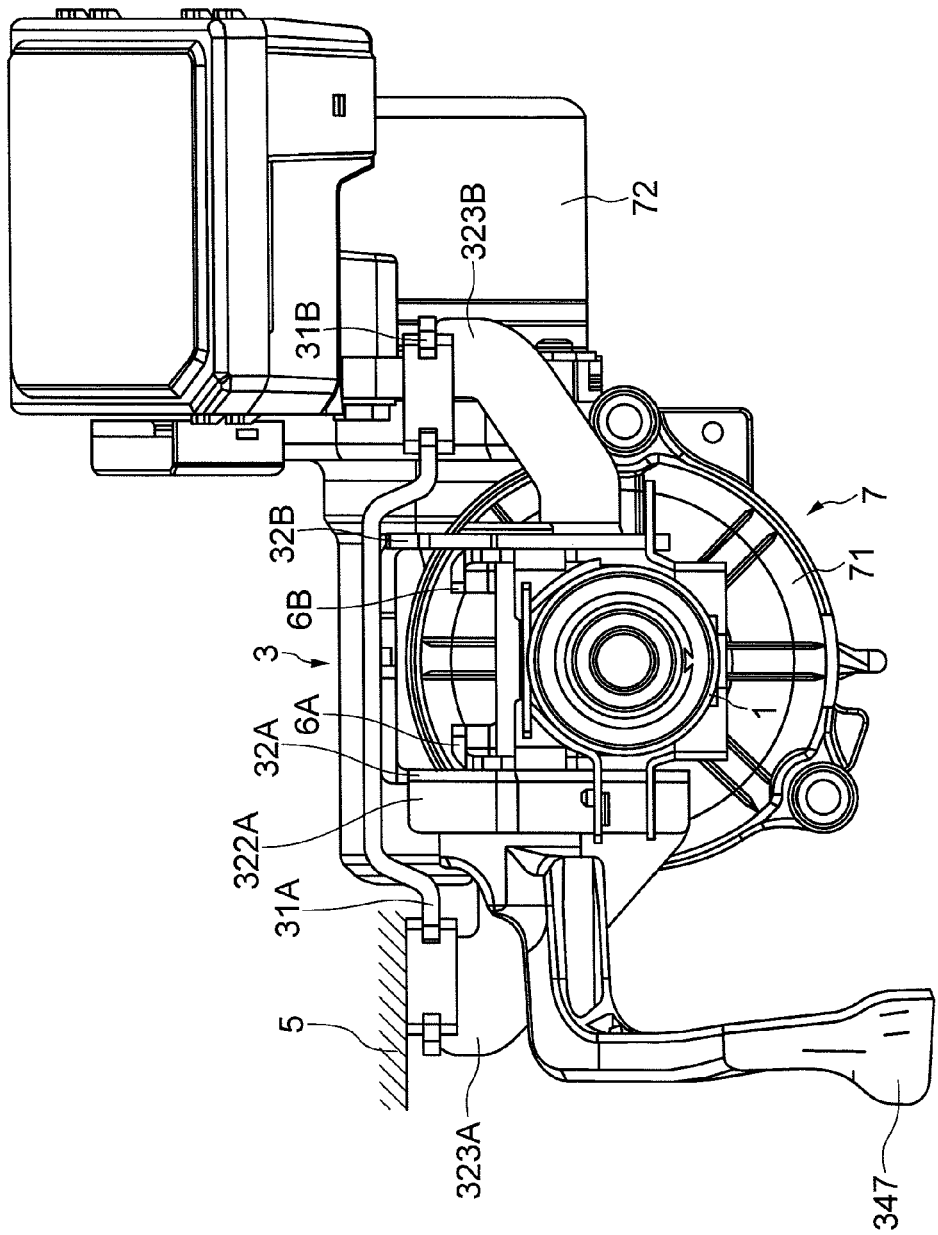
FIG. 7 is a view seen from the direction of arrow 7R in FIG. 4.
Figure 8:
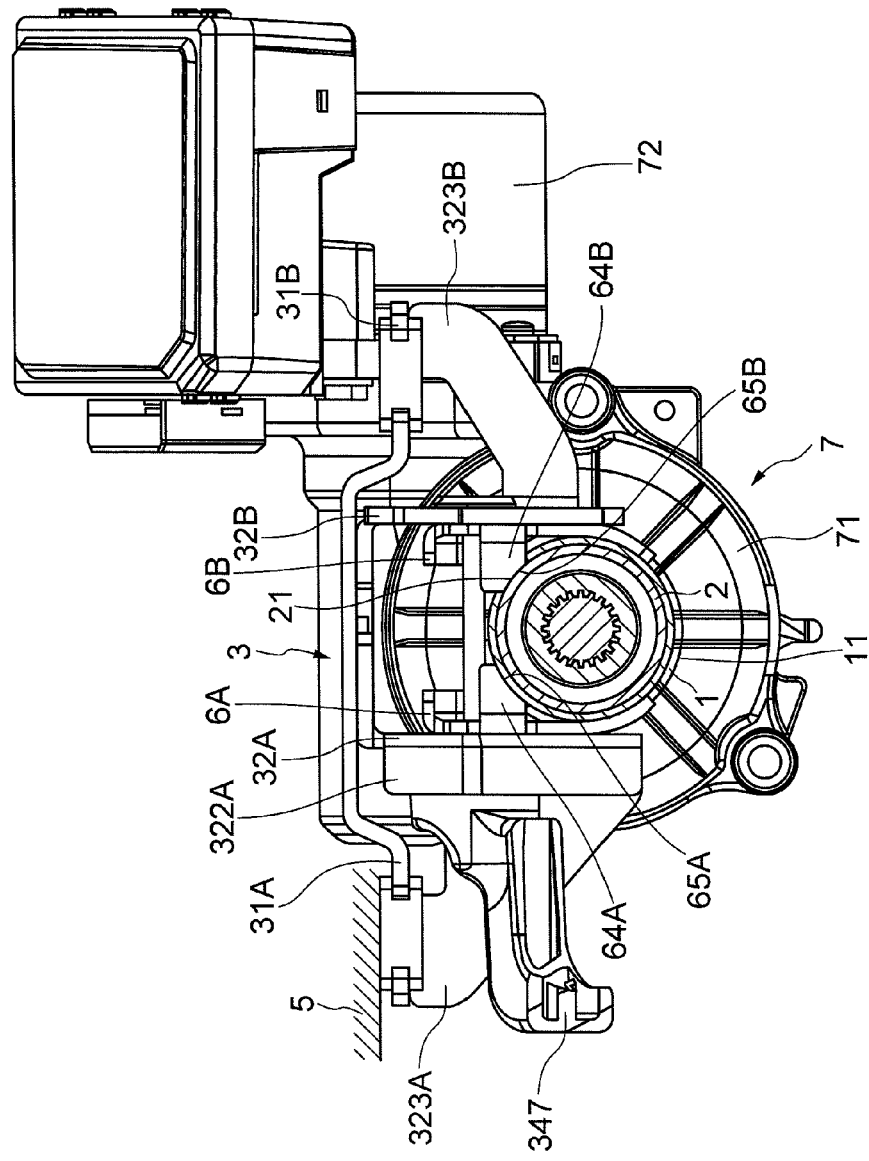
FIG. 8 is a cross sectional view taken on line 8A-8A in FIG. 4.
Figure 9:
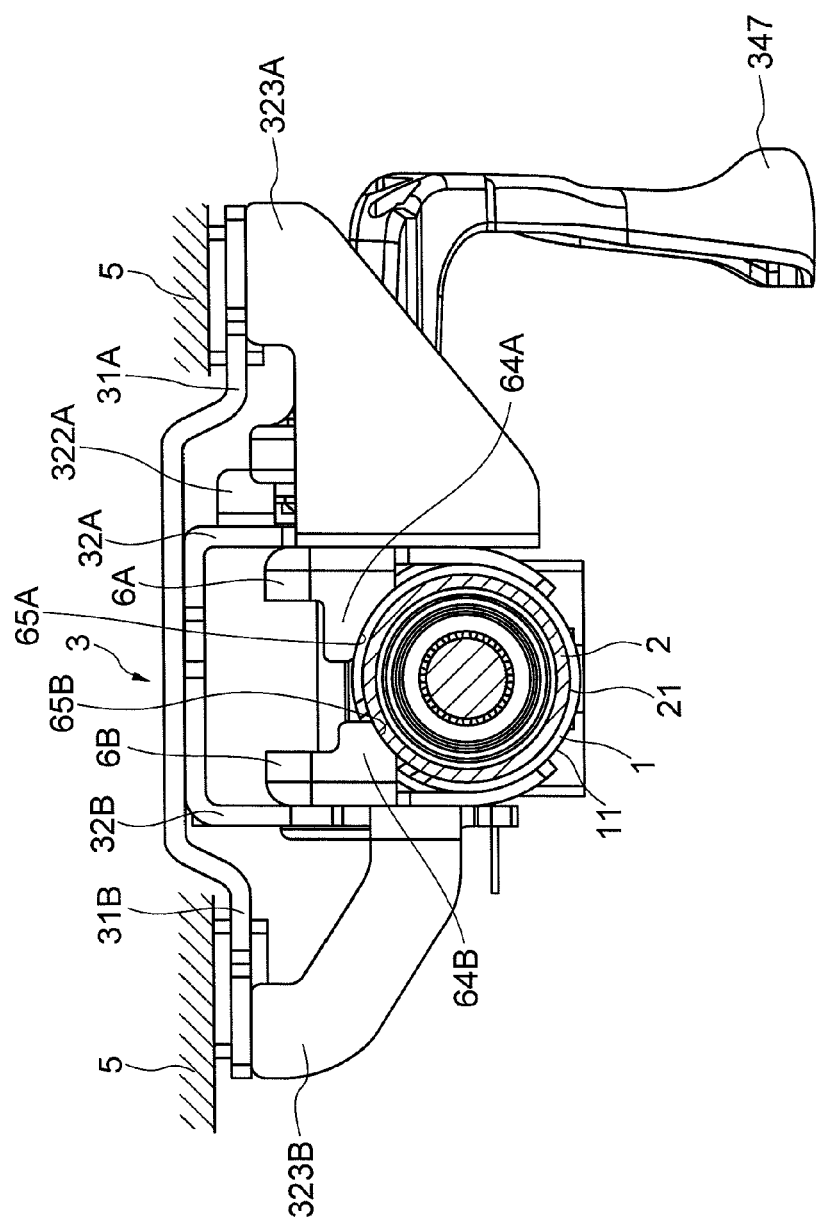
FIG. 9 is a cross sectional view taken on line 9B-9B in FIG. 4.
Figure 10:
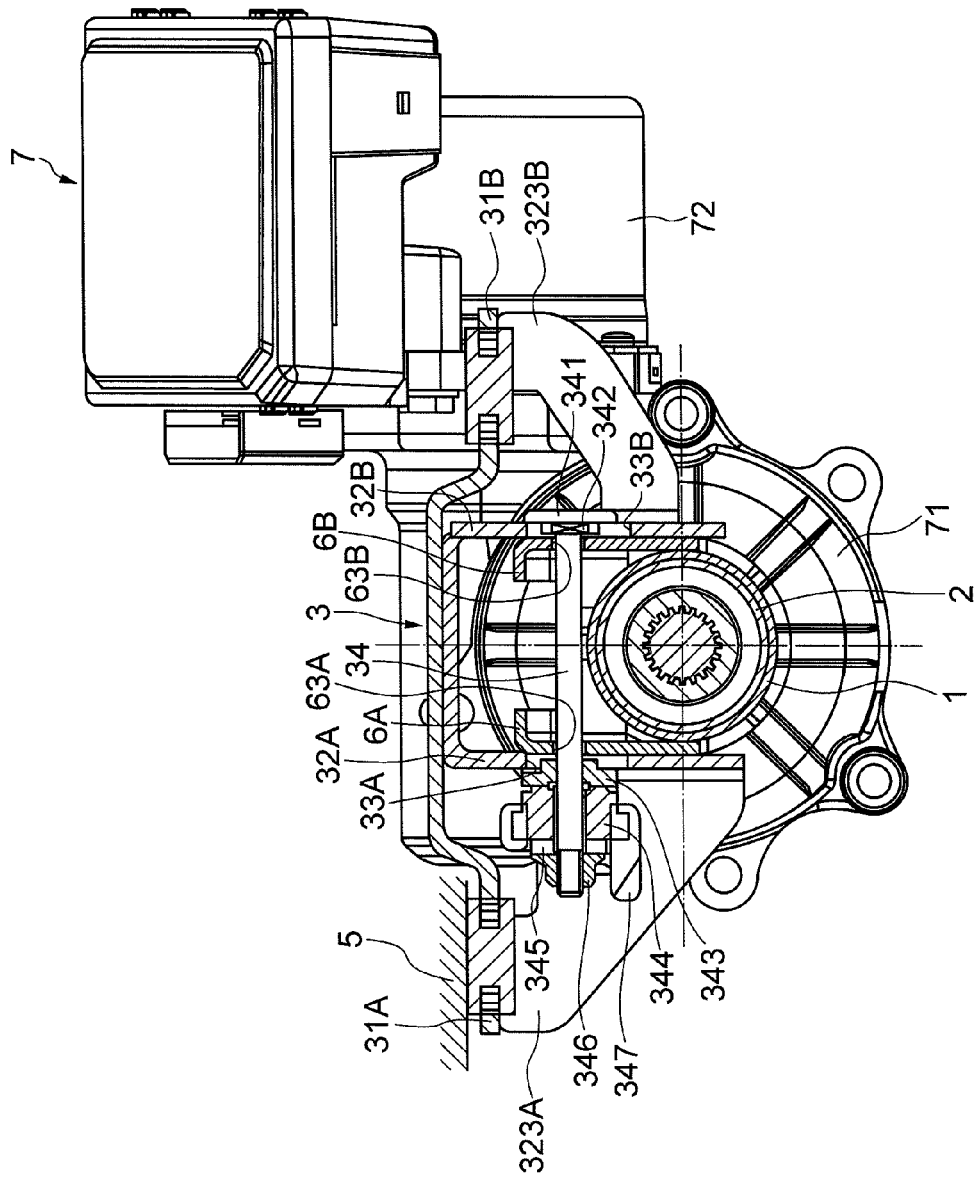
FIG. 10 is a cross sectional view taken on line 10C-10C in FIG. 5.

FIG. 2 is a front perspective view of the steering apparatus according to the embodiment of the present invention seen from above. FIG. 3 is a rear perspective view of the steering apparatus according to the embodiment of the present invention seen from above. FIG. 4 is a top plan view of the steering apparatus shown in FIG. 2. FIG. 5 is a view seen from the direction of arrow 5P in FIG. 4. FIG. 6 is a view seen from the direction of arrow 6Q in FIG. 4. FIG. 7 is a view seen from the direction of arrow 7R in FIG. 4. FIG. 8 is a cross sectional view taken on line 8A-8A in FIG. 4. FIG. 9 is a cross sectional view taken on line 9B-9B in FIG. 4. FIG. 10 is a cross sectional view taken on line 10C-10C in FIG. 5.

As shown in FIGS. 2 to 10, an upper steering shaft 41 is rotatably supported inside the hollow cylindrical outer column 1 provided on the rear side, namely on the right side in FIGS. 4 to 6. The steering wheel 103 shown in FIG. 1 is attached on the rear side of the upper steering shaft 41. An inner column 2 is fitted in the outer column 1 from the front side, namely from the left side in FIGS. 4 to 6 in such a way that the inner column 2 is slidable in the axial direction. The outer column 1 is mounted on the vehicle body 5 by a vehicle mount bracket 3, which is an upper bracket that can be attached to the vehicle body. The outer column 1 is held between left and right side plates 32A, 32B of the vehicle mount bracket 3 as shown in FIG. 2 in such a way that the outer column 1 can slide in the tilt direction and in the telescopic direction.

An output shaft 74 connected with the upper steering shaft 41 inside the outer column 1 is rotatably supported inside the inner column 2. An assist apparatus 7 is attached to the front portion of the inner column 2. The assist apparatus 7 is a steering assist unit that exerts an assist torque to the output shaft 74. The assist apparatus 7 has a gear housing 71 in which an electric motor 72 is fixedly mounted. A worm gear connected to the rotary shaft (not shown) of the electric motor 72 engages with a worm wheel (not shown) in the gear housing 71.

The direction and magnitude of a torque exerted on the upper steering shaft 41 by the steering wheel 103 is detected by a torque sensor (not shown). The electric motor 72 is caused to operate in accordance with the measurement value of the torque sensor, and an assist torque of a specific magnitude and in a specific direction is given to the output shaft 74 via the reduction gear mechanism composed of the worm gear and the worm wheel. A flange portion 73 provided on the front side of the housing gear 71 is rotatably supported on the vehicle body (not shown). The tilt position of the gear housing 71, the inner column 2, and the outer column 1 can be adjusted about the flange portion 73 as a center shaft.

The left end of the output shaft 74 in FIGS. 4 to 6 is coupled to the intermediate shaft 105 via the universal joint 104 shown in FIG. 1. The lower end of the intermediate shaft 105 is coupled to the steering gear assembly 107 via the universal joint 106, as shown in FIG. 1. Thus, the assist torque generated by the assist apparatus 7 is transmitted to the steering gear assembly 107 via the intermediate shaft 105 and other components to change the steering angle of the wheels.

Figure 11:
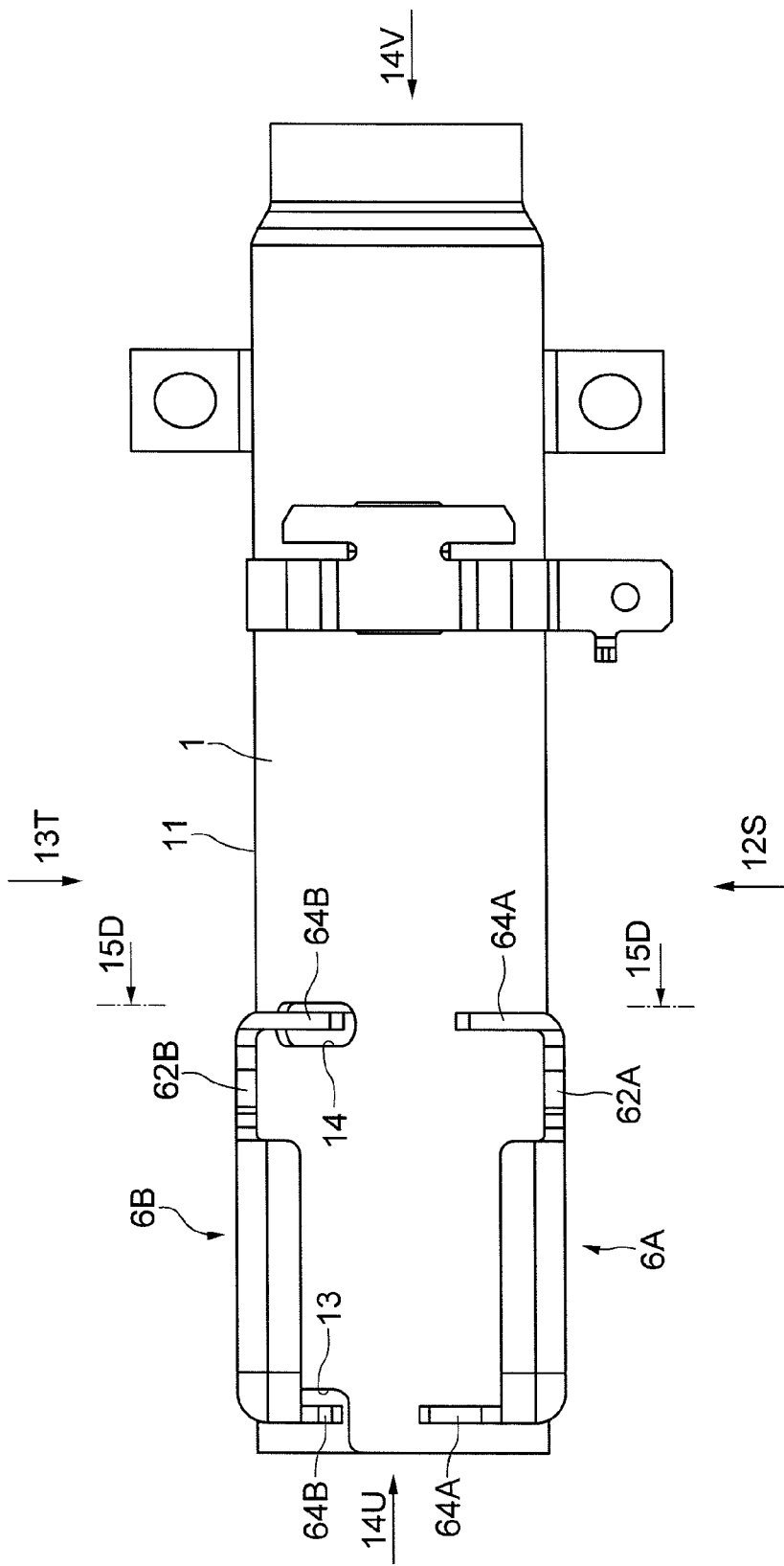
FIG. 11 is a top plan view of an outer column and distance brackets of the steering apparatus shown in FIG. 2.
Figure 12:
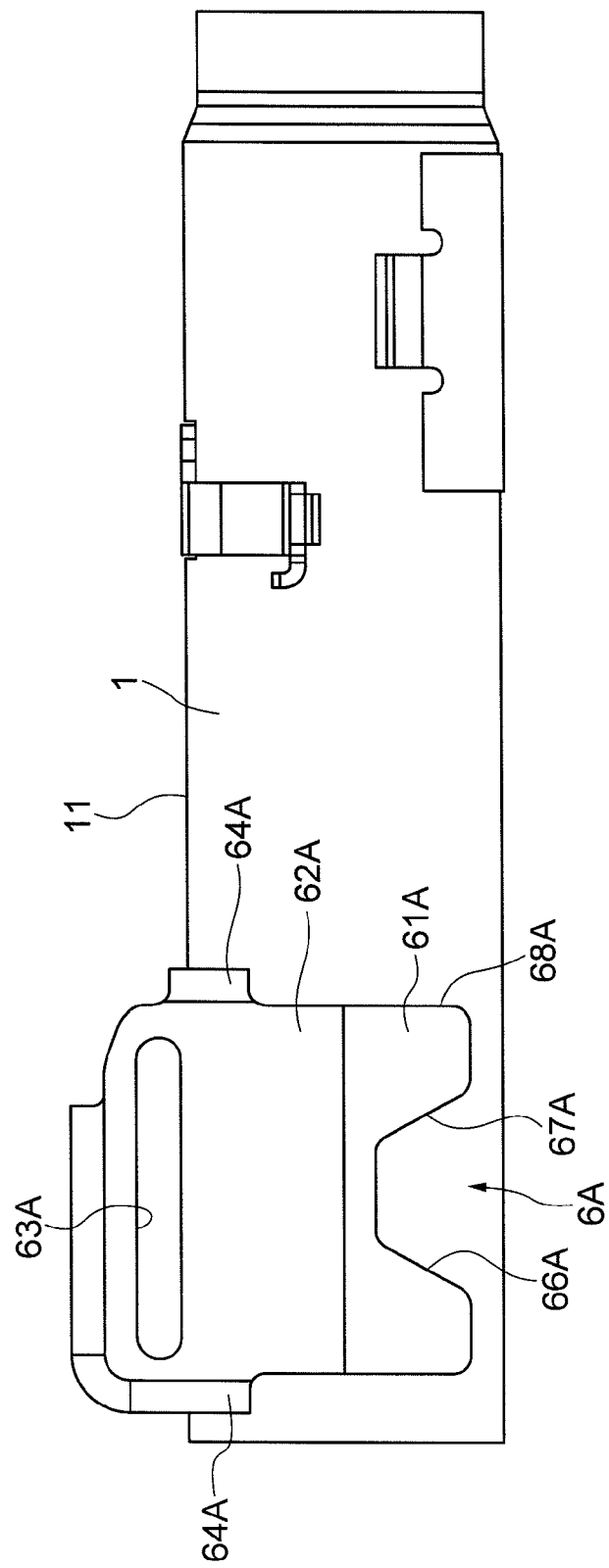
FIG. 12 is a view seen from the direction of arrow 12S in FIG. 11.
Figure 13:
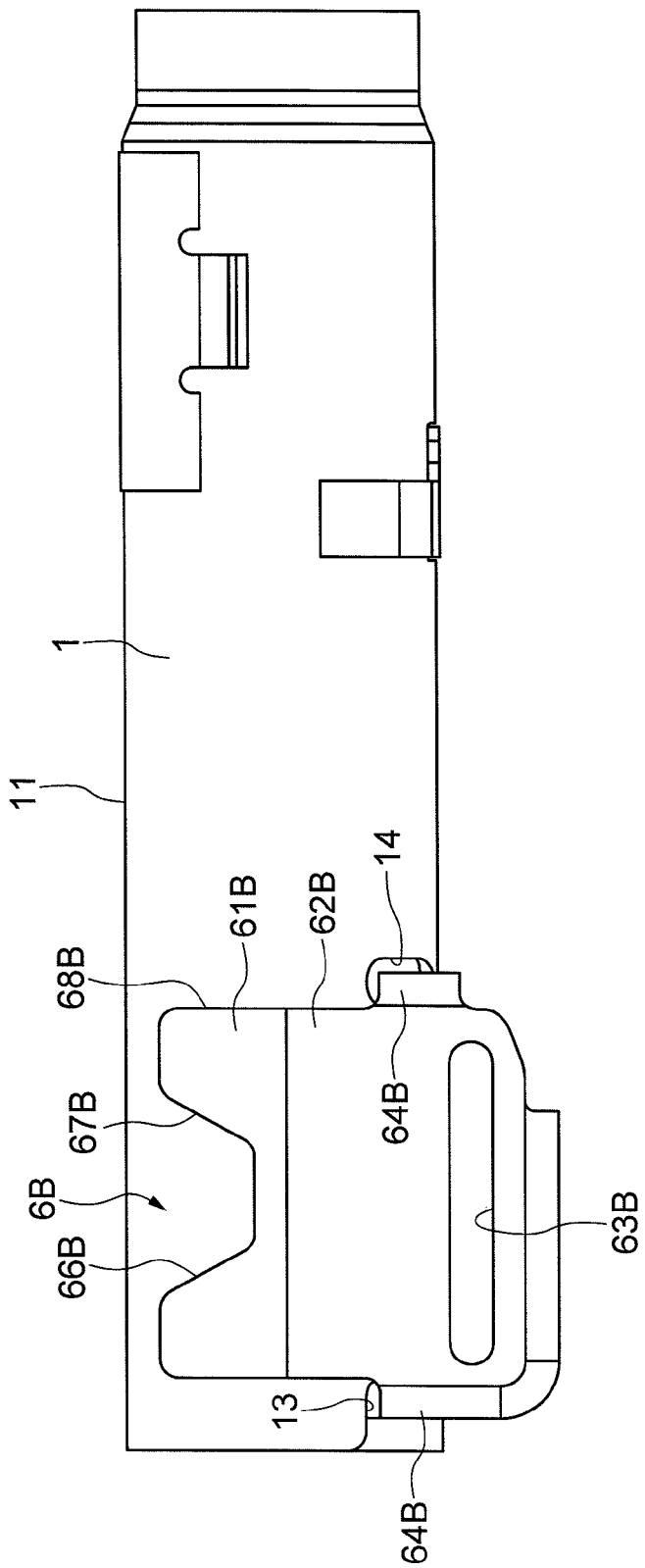
FIG. 13 is a view seen from the direction of arrow 13T in FIG. 11.
Figure 14A:
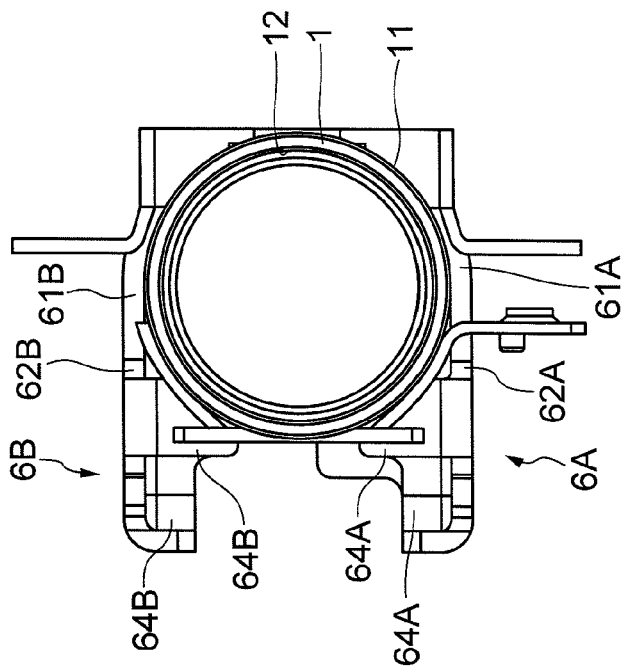
FIG. 14A is a view seen from the direction of arrow 14U in FIG. 11.
Figure 14B:
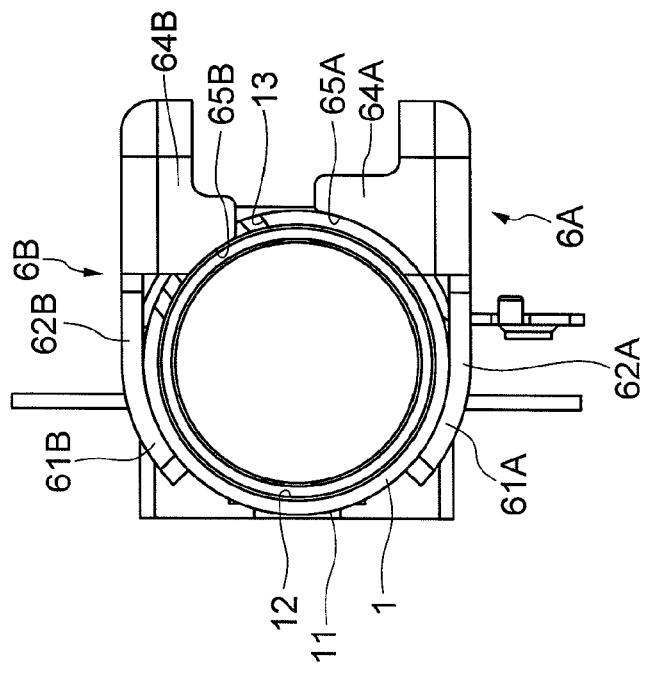
FIG. 14B is a view seen from the direction of arrow 14V in FIG. 11.
Figure 15:
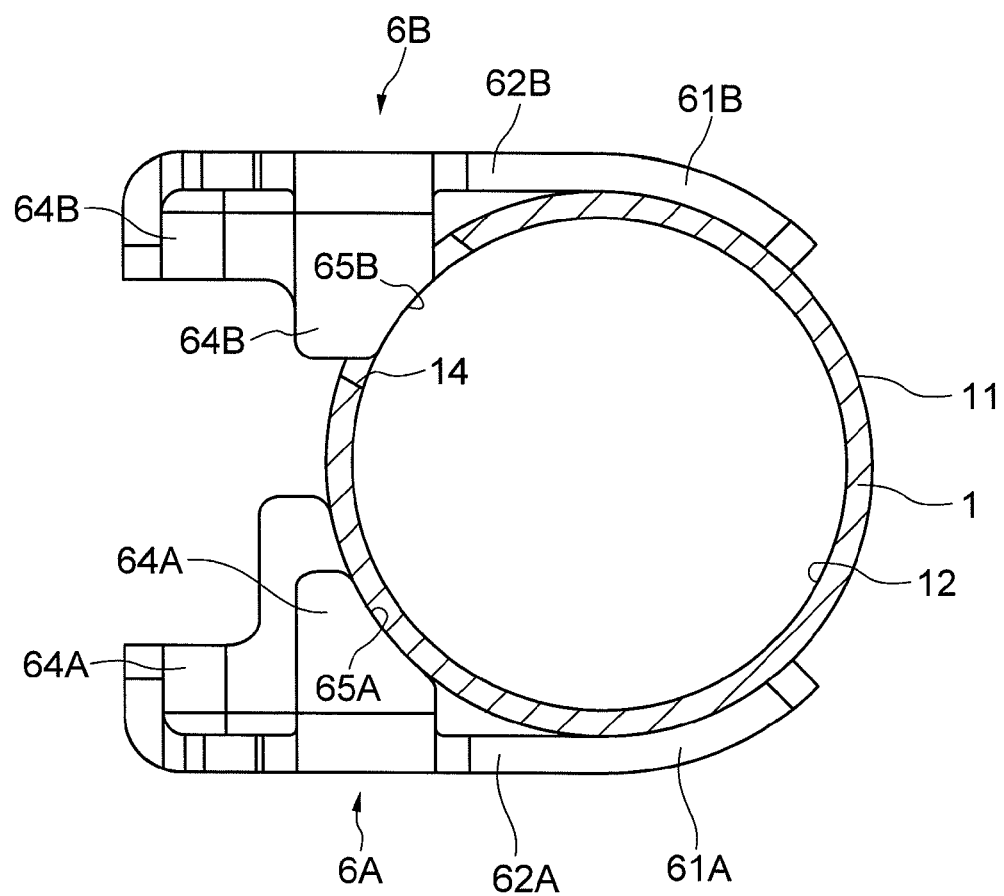
FIG. 15 is a cross sectional view taken on line 15D-15D in FIG. 11.
Figure 16:
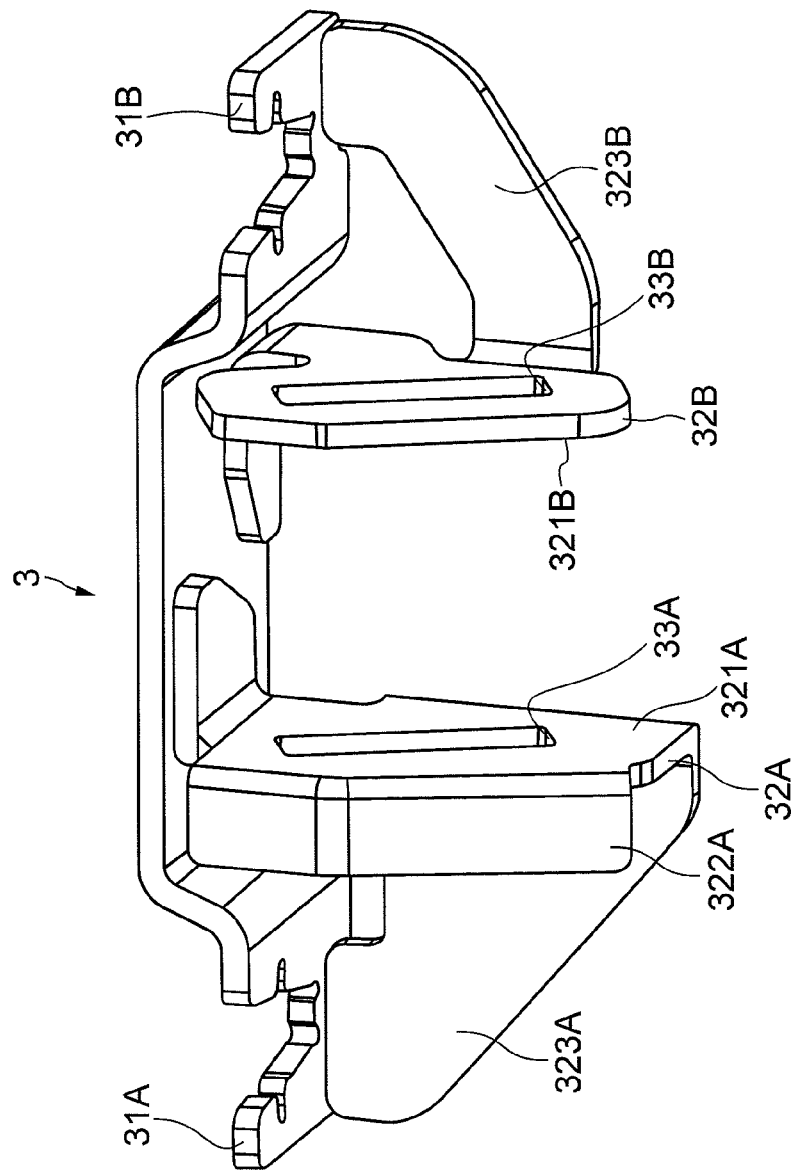
FIG. 16 is a rear perspective view of a vehicle mount bracket of the steering apparatus shown in FIG. 2 alone seen from below.

FIG. 11 is a top plan view of the outer column and distance brackets of the steering apparatus shown in FIG. 2. FIG. 12 is a view seen from the direction of arrow 12S in FIG. 11. FIG. 13 is a view seen from the direction of arrow 13T in FIG. 11. FIG. 14A is a view seen from the direction of arrow 14U in FIG. 11. FIG. 14B is a view seen from the direction of arrow 14V in FIG. 11. FIG. 15 is a cross sectional view taken on line 15D-15D in FIG. 11. FIG. 16 is a rear perspective view of the vehicle mount bracket of the steering apparatus shown in FIG. 2 alone seen from below.

As shown in FIGS. 2 to 10 and 16, the upper portion of the vehicle mount bracket 3 is provided with left and right flanges 31A, 31B for attaching the vehicle mount bracket 3 on the vehicle body 5, which are extending in the vehicle width direction. The vehicle mount bracket 3 has left and right side plates 32A, 32B extending in the vertical direction. The side plates 32A, 32B are integral with the flanges 31A, 31B. A left distance bracket 6A and a right distance bracket 6B are held between the inner faces 321A, 321B of the left and right side plates 32A, 32B in such a way that the left and right distance brackets 6A, 6B can move in the telescopic direction and the tilt direction.

The left distance bracket 6A and the right distance bracket 6B are substantially symmetric with respect to a vertical plane containing the center axis of the outer column 1, as shown in FIGS. 2 and 8. The left distance bracket 6A and the right distance bracket 6B are produced by bending a rectangular iron plate. The left distance bracket 6A and the right distance bracket 6B respectively have circular arc portions 61A, 61B at their lower ends with respect to the vehicle body. The circular arc portions 61A, 61B are fitted along the outer circumference 11 of the outer column 1. As shown in FIGS. 12 and 13, the circular arc portions 61A, 61B are provided with inclined sides 66A, 67A, 66B, 67B inclined relative to the center axis of the outer column 1 as seen from the side.

The circular arc portions 61A, 61B of the left distance bracket 6A and the right distance bracket 6B are fitted on the outer circumference 11 of the outer column 1, and the inclined sides 66A, 67A, 66B, 67B are fixed to the outer circumference 11 by welding. Moreover, perpendicular sides on the rear side of the circular arc portions 61A, 61B of the distance brackets 6, specifically the sides 68A, 68B that are perpendicular to the center axis of the outer column 1 as seen from the side are fixed to the outer circumference 11 by welding.

Thus, when the left distance bracket 6A and the right distance bracket 6B are welded to the outer column 1, there are two welded portions including the portion inclined to the center axis of the outer column 1 and the portion perpendicular to the center axis of the outer column 1 as seen from the side. This prevents the inner circumference 12 of the outer column 1 shown in FIG. 15 from deforming elliptically and the outer column 1 from curving to deviate from the axis. Therefore, a manufacturing step of correcting such deformations can be eliminated, enabling to prevent increase in the manufacturing cost.

As shown in FIGS. 2 and 3, the left distance bracket 6A and the right distance bracket 6B respectively have flat portions 62A, 62B in their upper portions with respect to the vehicle body. The flat portions 62A, 62B are parallel to the side plates 32A, 32B of the vehicle mount bracket 3. The flat portions 62A, 62B are held between inner faces 321A, 321B of the left and right side plates 32A, 32B of the vehicle mount bracket 3 in such a way that the side plates 32A, 32B can move in the telescopic direction and in the tilt direction. The flat portions 62A, 62B are provided with long grooves 63A, 63B for telescopic adjustment, which extend along the axial direction, namely along the horizontal direction in FIGS. 12 and 13. As shown in FIG. 3, the side plates 32A, 32B of the vehicle mount bracket 3 are provided with long grooves 33A, 33B for tilt adjustment, and a round fastening rod 34 passes through the long grooves 33A, 33B for tilt adjustment and the long grooves 63A, 63B for telescopic adjustment on the flat portions 62A, 62B. Specifically, as shown in FIG. 10, the fastening rod 34 is inserted into the long grooves 33A, 33B for tilt adjustment and the long grooves 63A, 63B for telescopic adjustment from the right in FIG. 10. The long grooves 33A, 33B for tilt adjustment have a circular arc shape having a center on the tilt center axis, which is not shown in the drawings.

As shown in FIG. 11, the flat portion 62A of the left distance bracket 6A and the flat portion 62B of the right distance bracket 6B are provided with bent portions 64A, 64A, 64B, 64B at their both ends with respect to the front-rear direction of the vehicle body. The bent portions 64A, 64A, 64B, 64B are bent at a right angle from the flat portions 62A, 62B inwardly with respect to the vehicle width direction.

As shown in FIGS. 8 and 9, the bent portions 64A, 64A, 64B, 64B have circular arc shaped fastening portions 65A, 65A, 65B, 65B on their inner side with respect to the vehicle width direction. As shown in FIG. 11, the outer column 1 is provided with through holes 13, 14 into which the fastening portions 65B, 65B of the right distance bracket 6B are inserted. There are two separate through holes 13, 14 having short lengths along the axial direction with one being located front and the other being located rear. The through holes 13, 14 pass through the outer column 1 from its outer circumference 11 to its inner circumference 12. One through hole 13 is provided at the front end of the outer column 1 and has a rectangular shape that opens on the front side. The other through hole 14 is provided at a rear position on the outer column 1 and has a rectangular shape extending along the circumferential direction of the outer column 1.

The fastening portions 65B, 65B of the right distance bracket 6B are inserted respectively into the through holes 13, 14 and able to be in contact with the outer circumference 21 of the inner column 2 to directly fasten the outer circumference 21 of the inner column 2. It is preferred that the radius of the fastening portions 65B, 65B be equal to or a little larger than the radius of the outer circumference 21 of the inner column 2. The inner column 2 is fitted to the inner circumference 12 of the outer column 1 in such a way as to be slidable along the axial direction. The shape of the fastening portions 65B, 65B is not limited to the circular arc shape, but it may be straight. The fastening portions 65A, 65A of the left distance bracket 6A can be in contact with the outer circumference 11 of the outer column 1 to fasten the outer circumference 11 of the outer column 1.

As shown in FIG. 10, the fastening rod 34 is provided with a head portion 341 at its right end. The head portion 341 abuts the outer side face of the side plate 32B of the vehicle mount bracket 3. The head portion 341 of the fastening rod 34 has a rotation stopper 342 provided on the left side of the outer circumference thereof and having a rectangular cross section with a width a little smaller than the width of the long groove 33B for tilt adjustment. The rotation stopper 342 fits into the long groove 33B for tilt adjustment to prevent the rotation of the fastening rod 34 relative to the vehicle mount bracket 3 and allows the fastening rod 34 to slide along the long groove 33B for tilt adjustment when the tilt position adjustment is performed.

On the outer circumference of the left end portion of the fastening rod 34, a fixed cam 343, a movable cam 344, a thrust bearing 345, and an adjusting nut 346 are externally fitted in the mentioned order, and female threads provided in the inner circumference of the adjusting nut 346 is screwed to male threads provided on the left end portion of the fastening rod 34. An operation lever 347 is fixedly attached to the movable cam 344. The movable cam 344 integrally operated by the operation lever 347 and the fixed cam 343 constitute a cam lock mechanism. The fixed cam 343 engages with the long groove 33A for tilt adjustment and does not rotate relative to the vehicle mount bracket 3. The fixed cam 343 slides along the long groove 33A for tilt adjustment when the tilt position adjustment is performed.

When the operation lever 347 is turned to cause a crest of the movable cam 344 to ride over a crest of the fixed cam, the movable cam 344 pushes the fixed cam 343 rightward in FIG. 10 and pulls the fastening rod 34 leftward, thereby tightening the side plates 32A, 32B of the vehicle mount bracket 3. Thus, the inner faces 321A, 321B of the side plates 32A, 32B fasten the flat portions 62A, 62B of the left distance bracket 6A and the right distance bracket 6B. This causes the flat portions 62A, 62B to elastically deform inward with respect to the vehicle width direction, so that the fastening portions 65B, 65B of the bent portions 64B, 64B directly fasten the outer circumference 21 of the inner column 2. Furthermore, the fastening portions 65A, 65A of the bent portions 64A, 64A fasten the outer circumference 11 of the outer column 1

When the operation lever 347 is turned in the reverse direction to cause the crest of the fixed cam 343 to enter a root of the movable cam 344, the force exerted rightward on the fixed cam 343 by the movable cam 344 is removed. At the same time, the leftward pulling force exerted on the fastening rod 34 by the movable cam 344 is removed, so that the side plates 32A, 32B are moved away, the elastic deformation of the flat portions 62A, 62B is removed, and fastening by the fastening portions 65B, 65B, 65A, 65A is removed.

With the clamp apparatus having the above-described structure, the outer column 1, the left distance bracket 6A and the right distance bracket 6B can be clamped/unclamped to/from the vehicle mount bracket 3 at a desired tilt and telescopic positions.

As shown in FIG. 16, the left side plate 32A of the vehicle mount bracket 3 is provided, at its rear end, with an strengthening rib 322A that is bent outwardly with respect to the vehicle width direction. Moreover, the left side plate 32A is provided, at its front end, with a triangular strengthening rib 323A that is bent outwardly with respect to the vehicle width direction. The right side plate 32B is also provided, at its front end, with a strengthening rib 323B that is bent outward with respect to the vehicle width direction. This strengthening rib 323B has a moment of inertia of area smaller than that of the left strengthening rib 323A.

Therefore, the left side plate 32A is designed to have a moment of inertia of area larger than that of the right side plate 32B. In consequence, when the left and right side plates 32A, 32B shown in FIG. 10 are fastened against the left distance bracket 6A and the right distance bracket 6B by the above-described clamp apparatus, the right side plate 32B deforms to a larger extent than the left side plate 32A. Consequently, the left side plate 32A moves little, and the left distance bracket 6A fastened by the left side plate 32A also moves little. The right side plate 32B, which deforms to a larger extent, fastens the right distance bracket 6B, whereby fastening of the outer circumference 21 of the inner column 2 by the fastening portion 65B of the right distance bracket 6B and the fastening of the outer circumference 11 of the outer column 1 by the fastening portion 65A of the left distance bracket 6A are achieved. Since the left side plate 32A and the left distance bracket 6A move little upon fastening as described above, the center axis of the outer column 1 and the inner column 2 can be positioned at a predetermined position, and the center axis of the upper steering shaft 41 can also be positioned at a predetermined position accordingly.

In this embodiment, the left distance bracket 6A having the fastening portion 65A that fastens the outer circumference 11 of the outer column 1 is disposed on the side of the side plate 32A that deforms little upon fastening by the clamp apparatus, and the right distance bracket 6B having the fastening portion 65B that fastens the outer circumference 21 of the inner column 2 is disposed on the side of the side plate 32B that deforms to a larger extent than the side plate 32A upon fastening. However, the arrangement is not limited to this, but a distance bracket having a fastening portion that fastens the outer circumference of the inner column may be disposed on the side of a side plate that deforms little upon fastening, and a distance bracket having a fastening portion that fastens the outer circumference of the outer column may be disposed on the side of a side plate that deforms to a larger extent upon fastening.

With the above described structure, after the left distance bracket 6A, the right distance bracket 6B, and the inner column 2 are unclamped from the vehicle mount bracket 3, the outer column 1 is slid relative to the inner column 2 along the axial direction by handling the steering wheel 103 to adjust the outer column 1 to a desired telescopic position. During this operation, the left distance bracket 6A and the right distance bracket 6B, which are attached to the outer column 1, also slide in the axial direction while being guided by the fastening rod 34. Abutment of the front or rear end of the long groove 63A, 63B for telescopic adjustment of the left distance bracket 6A and the right distance bracket 6B to the fastening rod 34 prevents further movement of the left distance bracket 6A, the right distance bracket 6B, and the inner column 1 along the axial direction. With this feature, the stroke of movement of the outer column 1 along the axial direction can be restricted appropriately. Therefore, the steering apparatus according to this embodiment does not need to be provided with an additional telescopic stopper mechanism for restricting the stroke, and has a simple structure. In consequence, reduction in the manufacturing cost can be achieved.

Moreover, the left distance bracket 6A, the right distance bracket 6B, and the outer column 1 are adjusted to a desired tilt position about the tilt center axis not shown in the drawings by handling the steering wheel 103. Thereafter, the left distance bracket 6A, the right distance bracket 6B, and the outer column 1 are clamped to the vehicle mount bracket 3.

In this embodiment, the fastening portion 65B of the right distance bracket 6B directly fastens the outer circumference 21 of the inner column 2. Therefore, the fastening force exerted on the inner column 2 by the left distance bracket 6A and the right distance bracket 6B does not change depending on the telescopic position of the steering wheel. Moreover, since the left distance bracket 6A and the right distance bracket 6B are always held between the side plates 32A, 32B of the vehicle mount bracket 3, it is not necessary to additionally provide a mechanism for preventing rotation of the outer column 1 and the inner column 2. Therefore, the structure is simple, and reduction in the manufacturing cost can be achieved.

While in the above-described embodiment the distance bracket and the outer column are fixedly connected by welding, they may be fixedly connected by using a bolt or a pin, or by swaging. While in the above-described embodiment the outer column and the inner column are cylindrical, they may have a not-cylindrical shape, and the shape of the fastening portions may be modified in accordance with the outer circumferential shape of the inner column.

While in the above-described embodiment a case where the present invention is applied to a tilt and telescopic type steering apparatus that allows both tilt position adjustment and telescopic position adjustment has been described, the present invention may be applied to a telescopic type steering apparatus that allows only telescopic position adjustment.

While in the above-described embodiment the fastening rod is disposed above the outer column, the fastening rod may be disposed below the outer column.

While in the above-described embodiment the left distance bracket and the right distance bracket are separate parts, they may be an integral part.

While in the above-described embodiment a case where the present invention is applied to a steering apparatus in which the outer column is arranged on the rear side of the inner column has been described, the present invention may be applied to a steering apparatus in which the inner column is arranged on the rear side of the outer column.

The invention claimed is:

1. A steering apparatus comprising:
an inner column;
a hollow outer column externally fitted on said inner column in such a way as to be able to slide relative to said inner column in an axial direction;
a vehicle mount bracket that can be attached to a vehicle body;
a pair of distance brackets including a left distance bracket and a right distance bracket each having one end fixed to the outer circumference of said outer column, the pair of distance bracket being slidably held between left and right side plates provided in said vehicle mount bracket;
a fastening portion that is provided on the other end of one distance bracket among said pair of distance brackets and can be in contact With the outer circumference of said inner column to fasten the outer circumference of said inner column;
a fastening portion that provided on the other end of the other distance bracket among said pair of distance brackets and can be in contact with the outer circumference of said outer column to fasten the outer circumference of said outer column;
a through hole provided in the outer column, through which the fastening portion of said one distance bracket passes;
a clamp apparatus that fastens said left and right side plates of said vehicle mount bracket toward said pair of distance brackets,
wherein said inner column is clamped in such a way that it cannot move in the axial direction relative to said outer column by tightening said left and right side plates of said vehicle mount bracket, directly fastening the outer circumference of said inner column With the fastening portion of said one distance bracket, and fastening the outer circumference of said outer column with the fastening portion of said other distance bracket, and
when said left and right side plates of said vehicle mount bracket are fastened toward said pair of distance brackets by said clamp apparatus, said one distance bracket is in sliding contact with one side plate among said left and right side plates that elastically deforms to a larger extent than the other.

2. A steering apparatus according to claim 1, wherein said pair of distance brackets are separate parts.

3. A steering apparatus according to claim 2, wherein the fastening portion of said one distance bracket is provided at both ends of said one distance bracket with respect to the front-rear direction of the vehicle and on an inner face, with respect to the vehicle width direction, of a bent portion that is bent inward with respect to the vehicle width direction.

4. A steering apparatus according to claim 1, wherein said pair of distance brackets are respectively provided with long grooves extending along the axial direction of said inner column, through which a rod that is prevented from moving in the axial direction of said inner column by said left and right side plates of said vehicle mount bracket passes, and when said pair of distance brackets and said outer column are moved in the axial direction relative to said vehicle mount bracket, abutment of the front or rear end, with respect to the vehicle body, of said long grooves to said rod prevents further movement of said pair of distance brackets and said outer column in the axial direction.

5. A steering apparatus comprising:

an inner column;

a hollow outer column externally fitted on said inner column in such a way as to be able to slide relative to said inner column in an axial direction;

a vehicle mount bracket that can be attached to a vehicle body;

a pair of distance brackets including a left of distance bracket and a right distance bracket each having one end fixed to the outer circumference of said outer column, the pair of distance brackets being slidably held between left and right said plate provided in said vehicle mount bracket;

a fastening portion that is provided on the other end of one distance bracket among said pair of distance brackets and can be in contact with the outer circumference of said inner column to fasten the outer circumference of said inner column;

a fastening portion that is provided on the other end of the other distance bracket among said pair of distance brackets and can be in contact With the outer circumference of said outer column to fasten the outer circumference of said outer column;

a through hole provided in the outer column, through which the fastening portion of said one distance bracket passes;

a clamp apparatus that fastens said left and right side plates of side vehicle mount bracket toward said pair of distance brackets, wherein said inner column is clamped in such a way that it cannot move in the axial direction relative to said outer column by tightening said left and right said plates of said vehicle mount bracket, directly fastening the outer circumference of said inner column with the fastening portion of said one distance bracket, and fastening the outer circumference of said outer column with the fastening portion of said other distance bracket, and when said left and right side plates of said vehicle mount bracket are fastened toward said pair of distance brackets by said clamp apparatus, said one distance bracket is in sliding contact with one side plate among said left and right side plates that elastically deforms to a smaller extent than the other.

6. A steering apparatus according to claim 5, wherein said pair of distance brackets are separate parts.

7. A steering apparatus according to claim 6, wherein the fastening portion of said one distance bracket is provided at both ends of said one distance bracket with respect to the front-rear direction of the vehicle and on an inner face, with respect to the vehicle width direction, of a bent portion that is bent inward with respect to the vehicle width direction.

8. A steering apparatus according to claim 5, wherein said pair of distance brackets are respectively provided with long grooves extending along the axial direction of said inner column, through which a rod that is prevented from moving in the axial direction of said inner column by said left and right side plates of said vehicle mount bracket passes, and when said pair of distance brackets and said outer column are moved in the axial direction relative to said vehicle mount bracket, abutment of the front or rear end, with respect to the vehicle body, of said long grooves to said rod prevents further movement of said pair of distance brackets and said outer column in the axial direction.

* * * * *